United States Patent
Scheiter et al.

[11] Patent Number: 6,140,689
[45] Date of Patent: Oct. 31, 2000

[54] MICROMECHANICAL SENSOR

[75] Inventors: Thomas Scheiter, Oberhaching; Ulrich Näher; Christofer Hierold, both of München, all of Germany

[73] Assignee: Siemens Aktiengesellschaft, Munich, Germany

[21] Appl. No.: 09/202,837

[22] PCT Filed: Nov. 21, 1997

[86] PCT No.: PCT/DE97/02740

§ 371 Date: Dec. 21, 1998

§ 102(e) Date: Dec. 21, 1998

[87] PCT Pub. No.: WO98/23934

PCT Pub. Date: Jun. 4, 1998

[30] Foreign Application Priority Data

Nov. 22, 1996 [DE] Germany .................. 196 48 424

[51] Int. Cl.[7] .................. H01L 27/14; H01L 29/82; H01L 29/84
[52] U.S. Cl. .................. 257/414; 257/415; 257/420; 257/350; 361/283.4
[58] Field of Search .................. 29/25.42; 216/2, 216/56; 257/414–416, 347, 350, 417–420; 361/283.1, 283.4; 438/53

[56] References Cited

U.S. PATENT DOCUMENTS

| 4,332,000 | 5/1982 | Petersen | 361/283.4 |
| 5,146,435 | 9/1992 | Bernstein | 367/181 |
| 5,493,470 | 2/1996 | Zavracky et al. | 438/53 |
| 5,573,679 | 11/1996 | Mitchell et al. | 216/2 |
| 5,684,324 | 11/1997 | Bernstein | 257/415 |
| 5,883,779 | 3/1999 | Catanescu et al. | 361/283.1 |

FOREIGN PATENT DOCUMENTS

| 0 727 650 A2 | 8/1996 | European Pat. Off. |
| 44 41 903 C1 | 3/1996 | Germany . |

OTHER PUBLICATIONS

A new condenser microphone with a p+ silicon membrane— T. Bourouina et al., 1992.

A review of silicon microphones—Scheeper et al—Sensors and Actuators A 44 (1994) 1–11.

Fabrication of a silicon micromachined capacitive microphone using a dry–etch process—Ning et al—Sensors and Actuators A 53 (1996) 237–242.

*Primary Examiner*—Carl Whitehead, Jr.
*Assistant Examiner*—Jamie L. Davis
*Attorney, Agent, or Firm*—Hill & Simpson

[57] ABSTRACT

In a relative pressure sensor or miniaturized microphone as a micromechanical sensor component, a polysilicon membrane is arranged over a polysilicon membrane of an SOI substrate. A recess that is connected to the cavity between the membrane and the body silicon layer by openings in the body silicon layer is present in the substrate on the back side. Given an excursion of the membrane, a pressure equalization can therefore occur in the cavity as a result of these openings. The measurement occurs capacitatively by electrical connection of the electrically conductively doped membrane and a doped region formed in the body silicon layer.

6 Claims, 1 Drawing Sheet

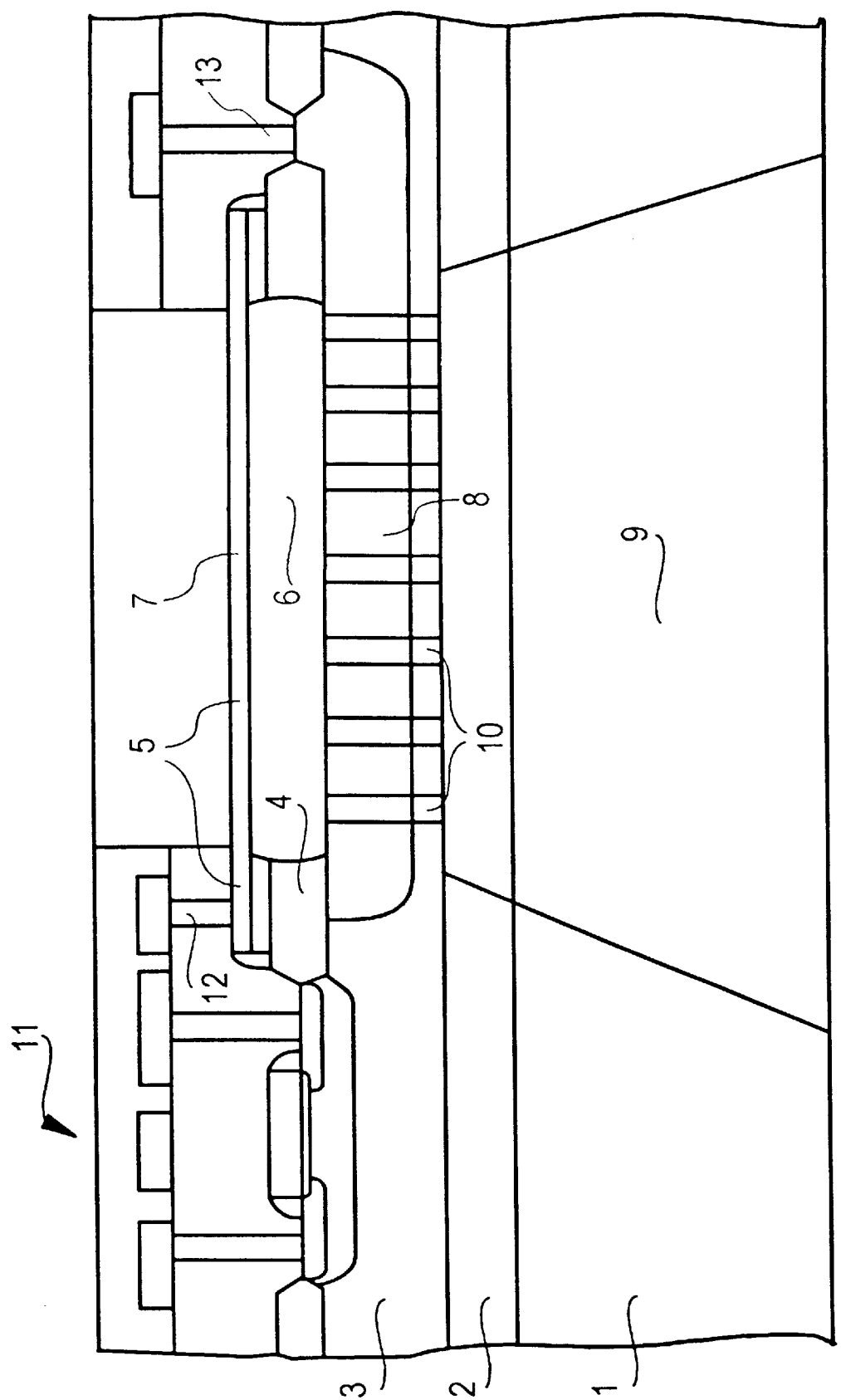

MICROMECHANICAL SENSOR

BACKGROUND OF THE INVENTION

Highly miniaturized sensors with the assistance of which pressure differences or pressure fluctuations can be measured are desired for various applications. An employment as a relative pressure sensor for measuring pressure difference comes into consideration, for example, when the relative pressure of a gas enclosed in a first volume is to be identified, compared to a gas enclosed in a second volume. In such a case, it is possible to separately measure the two pressures that prevail in the gas volumes and to compare these absolute measurements to one another. However, the measurement takes on an especially simple and expedient form when the same pressure sensor is in communication with both gas volumes, and an existing pressure difference thus has an immediate effect on the measured values supplied by this sensor.

Another possible employment for such a sensor is the measurement of brief-duration pressure fluctuations, particularly for acoustic waves, for which the sensor then represents a sound transducer, i.e. a microphone, for the conversion of the acoustic waves into electrical signals. Microphones have been manufactured as micromechanical components in silicon for approximately 12 years. An overview of the development is contained in the overview article by P. R. Scheeper et al., "A Review of Silicon Microphones" in Sensors and Actuators A 44, 1–11 (1994). When the electronic components provided for the drive circuit of the microphone are manufactured in the framework of a CMOS process, it is advantageous when the micromechanical components of the microphone are also manufactured compatible with this process. When a capacitative measurement of the electrically conductive microphone membrane relative to a cooperating electrode firmly arranged on a chip is provided for the microphone, two chips connected to one another have hitherto been employed. The micromechanical sensor structure with the membrane is located on the one chip; the cooperating electrode is arranged on the other chip. Such a microphone is described, for example, in the publication by T. Bourouina et al., "A new condenser microphone with a p$^+$ silicon membrane" in Sensors and Actuators A.31, 149–152 (1992).

A problem that results in micromechanical microphones is that small membranes can only be weakly deflected and therefore exhibit a low sensitivity to air pressure fluctuations. Moreover, the air between the measuring electrodes represents a great damping of the membrane because the air cannot be quickly and highly enough compressed. As a result thereof, the sensitivity of the microphone is reduced. It is therefore necessary to enable a pressure equalization of the air between the measuring electrodes.

SUMMARY OF THE INVENTION

An object of the present invention is to specify a micromechanical sensor for determining pressure differences or pressure fluctuations that can be simply manufactured and that can be connected to an electronic drive circuit in a simple way.

According to the present invention, the micromechanical sensor is provided formed of an SOI substrate with a silicon body layer, insulation layer, and bulk silicon layer. A spacer layer and a memory layer thereon are provided on the silicon body layer, a portion of the spacer layer being removed beneath the membrane so that a cavity is formed between the membrane and the silicon body layer. The membrane layer is designed to be electrically conductive at least at a membrane portion opposite the cavity in the membrane layer. A doped region is formed in the silicon body layer and what is a perpendicular projection of the membrane with respect to layer planes. A material of the insulation layer and a material of the bulk silicon layer is removed in what is the perpendicular projection of the membrane with respect to the layer planes, so that a recess is present thereat. The silicon body layer comprises openings and what is the perpendicular projection of the membrane with respect to the layer planes, said openings connecting a cavity between the membrane and the doped region with the recess.

The sensor of the invention employs an SOI substrate wherein a thicker bulk silicon layer is separated from a thin silicon layer body by an insulation layer that, for example, can be silicon dioxide. The membrane of the sensor is arranged over the silicon layer on a spacer layer that comprises a cavity that enables an oscillation of the membrane. This cavity is connected to the environment by openings in the silicon layer body and by a large recess in the insulation layer and the bulk silicon layer, so that a pressure equalization can occur. Given an excursion of the membrane, the air volume enclosed under the membrane can be enlarged or diminished by inflow or outflow of air through the openings in the silicon body without having a significant change in pressure occur. The membrane is therefore only slightly damped given this sensor. The sensitivity of the sensor is increased as a result thereof, so that it is suitable, for example, as an insert in a microphone. This sensor structure can likewise be employed as a relative pressure sensor when a pressure difference between the medium above and the medium below the membrane is to be measured. This is enabled in that the back side of the membrane can also be exposed to an outside air pressure because of the openings toward the cavity.

BRIEF DESCRIPTION OF THE DRAWINGS

The drawing FIGURE illustrates a cross-section through the micromechanical sensor of the invention.

DESCRIPTION OF THE PREFERRED EMBODIMENTS

A more detailed description of the sensor of the invention follows on the basis of the attached Figure. This Figure shows a cross-section through a micromechanical sensor of the invention that is integrated with a MOSFET as an example. This MOSFET, for example, can be manufactured in the framework of a CMOS process.

The SOI substrate employed comprises a thick carrier layer that is preferably silicon and is referred to as bulk silicon layer 1. An insulation layer 2 that is preferably silicon dioxide is located thereon. The thin silicon layer, and what is referred to as the silicon body layer 3 present thereon, is provided for the manufacture of the components. A spacer layer 4 that carries the membrane layer 5 is situated on this silicon body layer 3. A cavity 6 which enables an oscillation of the membrane is located in this spacer layer 4. This membrane 7 is formed by a region of the membrane layer 5 that is free toward the outside and can therefore be exposed to an outside air pressure. The spacer layer 4 is preferably a material that is selectively etchable relative to the material of the membrane layer. When the membrane layer 5 is (crystalline) silicon or polysilicon, the spacer layer is preferably produced of silicon oxide. The spacer layer can then be an oxide layer produced by local thermal oxidation (LOCOS) at the upper side of the body silicon layer 3. A thin TEOS layer can be provided between the spacer layer 4 and the membrane layer 5 applied thereon.

A doped region 8 is formed in the silicon body layer 3. The membrane layer 5 is either doped electrically conductive or provided with a thin, electrically conductive, further layer, for example a vapor-deposited metal layer. For a capacitative measurement, electrical terminals are provided as contacts 12, 13 on the doped region 8 and the membrane layer 5. The capacitance of the sensors changes when the membrane 7 oscillates and thus changes its spacing from the doped region 8 functioning as a cooperating electrode. This change in capacitance can be converted into a measurable electrical signal (voltage, current) with a connected evaluation circuit, for example into a current produced by the change in capacitance when an electrical voltage is applied to the electrodes.

A recess 9 is present on the back side thereof in a projection of the membrane perpendicular to the layer plane. This recess 9 is formed by an opening in the bulk silicon layer 1 and the insulation layer 2. Openings 10 that connect the cavity 6 under the membrane with this recess 9 are located in the silicon body layer 3. These openings are so large and numerous that an equalization of the pressure in the cavity 6 that is good enough for the intended employment can occur in that air or some other gas flows in or out through these openings 10. A MOSFET 11 is shown as an example in the Figure in order to illustrate the possible integration of the micromechanical sensor with electronic components on the same substrate. The components required for a drive circuit can therefore be manufactured in integrated fashion on the same chip with the sensor of the invention in the framework of a CMOS process.

The manufacture of this sensor is based on an SOI substrate. The openings 10 to be produced in the body silicon layer can be produced in a simple way in that holes that extend down to the insulation layer 2 and that are filled with silicon dioxide are already etched into the silicon body layer 3 at the beginning. The doped region 8 is produced, for example by drive-in of dopant, as is an auxiliary layer (sacrificial layer) provided for the manufacture of the spacer layer 4. This auxiliary layer is best manufactured in that the upper side of the silicon body layer 3 is oxidized to silicon oxide by LOCOS. A thin TEOS layer is potentially deposited onto the upper side of this auxiliary layer and a polysilicon layer is applied on this TEOS layer. This polysilicon layer, which is provided for the membrane, is preferably produced no thicker than 1 $\mu$m. When the layer is only approximately 500 nm thick, the sensitivity of the sensors is correspondingly enhanced. For example, the polysilicon of the membrane layer 5 can be deposited in a process step together with the gate electrodes that are provided for the MOSFET. The electronic components in the silicon body layer are produced in a traditional way (traditional VLSI process, CMOS process). The upper side of the components is planarized, for example with BPSG (borophosphorous silicate glass). Via holes are produced in this planarization layer and filled with a contact metal for electrical connection of the individual regions to be connected. Various metallization levels are separated from one another by dielectric layers and manufactured and structured.

Subsequently, the substrate is processed proceeding from the back side. The bulk silicon layer 1 is etched out in the region of the sensor, for example with a suitable phototechnique. For example, the silicon can be selectively removed relative to $SiO_2$ with KOH. The insulation layer 2, which is preferably $SiO_2$, then acts as etch stop for this etching process. When the silicon to be removed for the recess 9 is etched out of the bulk silicon layer 1, the $SiO_2$ and the $SiO_2$ parts introduced into the openings 10 to be produced are removed. This is implemented selectively relative to silicon, for example with hydrofluoric acid (HF). The cavity 6 can be produced together with this etching step. The silicon dioxide of the auxiliary layer initially present in the region of the cavity 6 is then removed through the openings 10, which function here as etching openings. Alternatively thereto, it is possible to etch etching openings in the membrane layer 5, preferably in the region of the cavity 6 to be produced, before the planarization of the upper side of the silicon body layer 3 with BPSG, and to produce the cavity 6 upon employment of these etching openings. The planarization layer to be applied then simultaneously serves as closure layer with which the etching openings in the membrane layer are closed. A separate closure layer, which, for example, can be a metal, can also be applied onto the membrane layer. When such a metal layer is provided as a closure layer, the polysilicon of the membrane can remain undoped because the metallic closure layer can then be utilized as an electrode for the capacitative measurement. Due to the extremely thin layers that can be manufactured in such a VLSI process, this sensor has a great sensitivity, which is advantageous, particularly given an employment as a microphone.

The described sensor can also be employed as relative pressure sensor. The chip with the sensor is then attached between two separate gas containers. The gasses located in the two containers are then respectively in communication only with the upper side or the underside of the membrane. A utilization as a relative pressure sensor for detecting brief-duration pressure changes in a gas in front of the front side of the membrane relative to the gas behind the back side of the membrane also comes into consideration. For example, the sensor is thus suitable for detecting shock waves. The dimension of the openings 10 is to be correspondingly adapted, given a utilization of the sensor as a relative pressure sensor in liquids. In order to be able to acquire the excursion of the membrane toward the substrate (overpressure at the front side of the membrane) or away from the substrate (overpressure at the back side of the membrane), an identically structured, second sensor is preferably integrated on the same chip, given a relative pressure sensor. The structure of the micromechanical components in this second sensor functioning as a reference sensor is the same as the structure of the sensor provided for the measurement. However, an excursion of the membrane of this reference sensor is avoided, for example, in that a remaining portion of the auxiliary layer was left in the cavity 6. In the extreme case, the cavity can be omitted and completely replaced by the spacer layer 4. Due to the change thereby produced in the dielectric constant of the capacitor formed by the doped region 8 and the membrane 7, however, it is recommendable to remove as much material of the spacer layer 4 as possible, or to leave only one or very few residues for the support of the membrane 7 in the cavity 6. The membrane is thereby arrested in the normal position, i.e. in the position that a freely movable membrane assumes given identical pressure at the front side and back side of the sensor. A membrane excursion in the sensor provided for the measurement can be identified by comparison to the capacitance of this reference sensor. Given employment of a relatively simple drive circuit, a one-sided overpressure can be very exactly detected in this way.

Although various minor changes and modifications might be proposed by those skilled in the art, it will be understood that our wish is to include within the claims of the patent warranted hereon all such changes and modifications as reasonably come within our contribution to the art.

We claim as our invention:

1. A micromechanical sensor, comprising:

a SOI substrate with a silicon body layer, insulation layer, and bulk silicon layer;

a spacer layer and a membrane layer thereon on the silicon body layer, a portion of the spacer layer being removed so that a cavity is formed between a membrane of the membrane layer and the silicon body layer;

at least said membrane of the membrane layer being designed to be electrically conductive;

a doped region formed in the silicon body layer beneath the cavity;

a material of the insulation layer and a material of the bulk silicon layer being removed; so that a recess is present thereat; and the silicon body layer comprising openings, said openings connecting said recess with said cavity between the membrane and the doped region.

2. The sensor according to claim 1 wherein the membrane layer is designed to be electrically conductive.

3. The sensor according to claim 1 wherein the membrane layer is provided with an electrically conductive layer and a corresponding contact for electrical connection.

4. The sensor according to claim 1 whereby components of an electronic circuit for operation of the sensor are integrated in the silicon body layer.

5. The sensor according to claim 1 wherein in order to form a relative pressure sensor, a further sensor is present on the substrate as a reference sensor, at least a part of the spacer layer also being present in said further sensor in a region of a membrane layer forming the membrane of the further sensor and which prevents an excursion of the membrane.

6. A micromechanical sensor, comprising:

a silicon body layer, insulation layer, and bulk silicon layer as a layer stack;

a spacer layer and an electrically conductive membrane layer structure thereon on the silicon body layer, a portion of the spacer layer being removed so that a cavity is formed between the membrane layer structure and the silicon body layer;

a doped region formed in the silicon body layer structure beneath the cavity;

material of the insulation layer and material of the bulk silicon layer being removed beneath the doped region to form a recess; and the silicon body layer comprising openings connecting said cavity with the recess.

* * * * *